US006846548B2

(12) United States Patent
Harpell et al.

(10) Patent No.: US 6,846,548 B2
(45) Date of Patent: Jan. 25, 2005

(54) FLEXIBLE FABRIC FROM FIBROUS WEB AND DISCONTINUOUS DOMAIN MATRIX

(75) Inventors: Gary Allan Harpell, Morristown, NJ (US); Igor Palley, Madison, NJ (US); Max Wilheim Gerlach, Hackettstown, NJ (US); Alexander Lobovsky, New Providence, NJ (US); James Alan Matrunich, Linden, NJ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/253,245

(22) Filed: Feb. 19, 1999

(65) Prior Publication Data

US 2002/0034624 A1 Mar. 21, 2002

(51) Int. Cl.[7] .............................................. B32B 27/02
(52) U.S. Cl. .................... 428/198; 428/298.1; 428/911; 428/221; 428/292.1
(58) Field of Search ............................. 428/198, 298.1, 428/221, 292.1, 911

(56) References Cited

U.S. PATENT DOCUMENTS

| | | | |
|---|---|---|---|
| 3,686,048 A | 8/1972 | Schirtzinger | 156/161 |
| 4,132,828 A | 1/1979 | Nakamura et al. | 428/366 |
| 4,403,012 A | 9/1983 | Harpell et al. | 428/290 |
| 4,413,110 A | 11/1983 | Kavesh et al. | 526/348.1 |
| 4,501,856 A | 2/1985 | Harpell et al. | 525/240 |
| 4,563,392 A | 1/1986 | Harpell et al. | 428/394 |
| 4,623,574 A | 11/1986 | Harpell et al. | 428/113 |
| 4,820,568 A | 4/1989 | Harpell et al. | 428/113 |
| 5,061,545 A | 10/1991 | Li et al. | 428/195 |
| 5,093,158 A | 3/1992 | Li et al. | 427/278 |
| 5,558,448 A | * 9/1996 | Yabe et al. | 29/898.067 |
| 6,202,726 B1 | * 3/2001 | Corvasce et al. | 152/517 |

FOREIGN PATENT DOCUMENTS

| | | |
|---|---|---|
| GB | 2 067 611 | 7/1981 |
| WO | WO 91/08895 | 6/1991 |

OTHER PUBLICATIONS

"The Effect of Resin Concentration and Laminating Pressures on Kevlar Fabric Bonded with Modified Phenolic Resin", A.L. Lasstnik et al., Technical Report NATICK/TR–84/030, Jun. 8, 1984.

* cited by examiner

Primary Examiner—Elizabeth M. Cole
(74) Attorney, Agent, or Firm—Virginia Szigeti

(57) ABSTRACT

A composite having a plurality of filaments arranged in a fibrous web that is held together in a unitary structure by a domain matrix. The domain matrix comprises a plurality of matrix islands that individually connect, or bond, at least two filaments, to thereby hold the filaments in a unitary structure. Portions of the filament lengths within the unitary structure are free of matrix islands, causing the domain matrix to be discontinuous. The composite possesses a greater flexibility than coated structures. The composite may be formed into cross-plied structures. A method of making the composite also is disclosed.

22 Claims, 5 Drawing Sheets

FLEXIBLE FABRIC FROM FIBROUS WEB AND DISCONTINUOUS DOMAIN MATRIX

BACKGROUND OF THE INVENTION

1. Field of the Invention

The present invention relates to continuous fiber layer systems integrated with material domains that form matrix islands, and more particularly, to a method of making continuous fiber layer systems held together with matrix islands and compositions of matrix island latticed continuous fiber layer systems. The fiber layer systems of the present invention provide high strength composites with bending and strength characteristics especially useful in high-impact resistant, flexible articles.

2. Background of the Invention

Articles designed to resist ballistic impact, such as bulletproof vests, helmets, body armor, armor plate and other police and military equipment, structural members of helicopters, aircraft, ships, and vehicle panels and briefcases containing high strength fibers, are known. Known high strength fibers include aramid fibers, fibers such as poly(phenylenediamine terephthalamide), ultra-high-molecular-weight polyethylene, graphite fibers, ceramic fibers, nylon fibers, glass fibers and the like. The fibers are generally encapsulated or embedded in a continuous matrix material structure and, in some instances, are joined with rigid facing layers to form complex composite structures. Armor should provide protection against ballistic projectiles such as bullets and other like piercing objects or state of the art projectiles. However, body armor, bulletproof vests, etc. may be stiff and restrict the wearer's movement.

Ballistic-resistant composite articles have been disclosed in Harpell et al. U.S. Pat. Nos. 4,403,012; 4,501,856 and 4,563,392. These patents disclose networks of high strength fibers in matrices composed of olefin polymers and copolymers, unsaturated polyester resins, epoxy resins, and other resins curable below the melting point of the fiber. While such composites provide effective ballistic resistance, A. L. Lastnik et al.: "The Effect of Resin Concentration and Laminating Pressures on Kevlar Fabric Bonded with Modified Phenolic Resin", Technical Report NATICK/TR-84/030, Jun. 8, 1984, has disclosed that an interstitial resin, which encapsulates and bonds the fibers of a fabric, reduces the ballistic resistance of the resultant composite article. Therefore, a need exists to improve the structure of composites to effectively utilize the properties of the high strength fibers.

U.S. Pat. No. 4,623,574, Harpell et al., filed Jan. 14, 1985, and commonly assigned, discloses simple composites comprising high strength fibers embedded in an elastomeric matrix. Surprisingly, the simple composite structure exhibits outstanding ballistic protection as compared to a simple composite utilizing rigid matrices, the results of which are disclosed therein. Particularly effective are simple composites employing ultra-high molecular weight polyethylene and polypropylene such as disclosed in U.S. Pat. No. 4,413,110.

Composites having continuous domains are disclosed in the art, generally restricting the percentage of resin to be at least 10 volume percent of the fiber content. U.S. Pat. No. 4,403,012 discloses a matrix in the preferred range of 10–50% by weight of fibers. U.S. Pat. No. 4,501,856 discloses preferred fiber network content of 40 to 85 volume percent of the composite. U.S. Pat. No. 4,563,392 does not disclose any range for amounts of a matrix component. It is desirable to maintain as high a volume and/or weight percent of fiber as possible within a resultant composite to enhance ballistic resistance.

U.S. Pat. Nos. 5,061,545 and 5,093,158, both commonly assigned, disclose a fiber/polymer composite with non-uniformly distributed polymer matrix, and a method of making the composite. These patents are directed to a fibrous web having a network of unidirectional fibers, and a matrix composition non-uniformly, but continuously, distributed in the major plane of the fibrous web. The fibrous web becomes encased in the matrix composition, and although non-uniformly distributed, the matrix composition remains as a continuum, attaching to all fiber members of the fibrous web. The patents disclose non-uniformly distributing polymeric composition together with a fibrous web so that there is a patterned surface, causing portions of the resultant combined web to have greater amounts of polymer than other portions. Thus, the total amount of polymer necessary to maintain the integrity of the polymer-impregnated web was reduced. The patents further disclosed that the thick areas which provide the integrity of the polymeric layer preferably provide a continuous area along the surface of the fibrous/polymeric composite.

Other patents, such as U.S. Pat. No. 4,623,574, have shown the difficulty in preparing a composite made of a fabric web within a polymeric matrix. In Table 6, sample 12, when a high amount of fiber was used, the sample lacked consolidation and could not be tested.

Cost and fabric quality also affect the availability of armor. Conventional fabric cost rises dramatically as yarn denier decreases. Additionally both ballistic performance and flexibility improve as the areal density of individual layers decreases.

SUMMARY OF THE INVENTION

The present invention is a composite comprising a fibrous web and discontinuous domain matrix, preferably a polymeric composition. The domain matrix provides fixed matrix islands, or anchor points, within the fibrous web to bond portions of the fibrous web in a unitary structure. The matrix islands may attach as few as two filaments within the fibrous web, or may attach as many as all of the fibrous web filaments, including being shaped as a continuous string (highly elongated domain). With sufficient number, size, shape and distribution of matrix islands, the individual filaments within the fibrous web form a unitary structure.

A fibrous web is a layer defined by a plurality of fibers. Typically, the layer is thin and defines a surface, having a depth of at least one filament. Preferably, the fibrous web is a tape or layer in which the fibers are unidirectional. By unidirectional it is meant that the fibers are parallel to each other within the web, or that the fibers extend along a given directional axis, without overlap. Matrix islands are defined as anchor points that hold, and preferably bind, two or more filaments together, with each matrix island separated, or discontinuous, from other matrix islands forming a spatial distribution. Collectively, the matrix islands constitute a domain matrix that binds the fibrous web as a unitary flexible structure. The matrix islands may be distributed within the domain matrix in regular and/or random patterns. The amount of polymeric material of the domain matrix is sufficiently small to cause fiber areas without matrix to be present (hereafter "uncoated fiber" or "uncoated filaments"). Fiber webs may be cross-plied to form flexible panels.

The present invention includes a composite comprising a plurality of fibers, preferably arranged along a single directional axis, wherein the plurality of fibers are essentially parallel to each other, and matrix islands intersecting at least a portion of the plurality of fibers sufficient to hold, and preferably to bond, the plurality of fibers in a unitary structure, wherein the plurality of fibers possesses an out-of-plane flexibility.

Additionally, the present invention includes a method of making a composite of a fibrous web bridged with matrix islands comprising the steps of arranging a plurality of fibers in a layer, and placing a plurality of matrix islands within the plurality of fibers so that each matrix island intersects a sufficient portion of the plurality of fibers so as to hold, and preferably to bond, the plurality of fibers in a unitary structure.

The composite of the present invention can form a flexible, preferably unidirectional, tape (also referred to as uni-tape) that may be used as a precursor in conventional textile processes of tape laying or filament winding. Cross-sectional shapes of the composite may vary with usage, such as a flat ribbon shape, elliptical shapes, circular shapes, and specialty shapes that are preferable for given textile processes such as braiding and knitting. Layers of flexible prepreg may be combined to form cross-plied products.

The composite of fibrous web and matrix domains, and method, of the present invention maintains web integrity yet results in a composite with significant advances in volume ratio of fiber to polymer than previously known in the art. These structures are ballistically efficient and highly flexible, with the ability to transmit water vapor.

DETAILED DESCRIPTION OF THE INVENTION

Figure 1A:
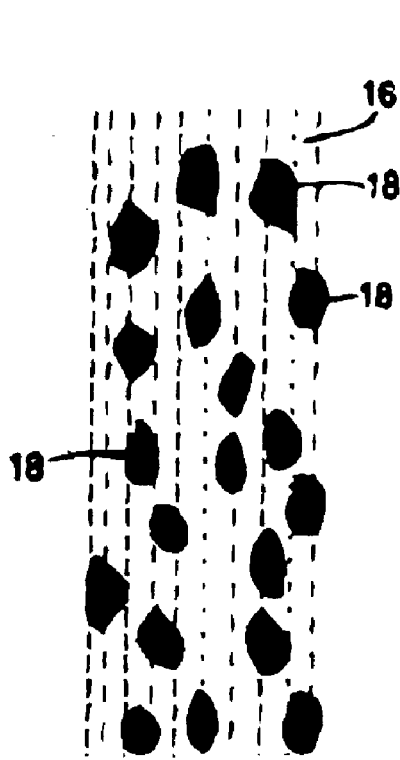
FIG. 1A illustrates the domain matrix of FIG. 1.

The present invention is directed to a composite having filaments defining a fibrous web fixed by a domain matrix. The composite preferably contains a plurality of filaments in the form of parallel fibers, referred to as a parallel filament array, fixed in the domain matrix. The domain matrix is comprised of a plurality of matrix islands, preferably made of polymeric material, spatially distributed within the domain matrix. The matrix islands jointly anchor and maintain the filaments of the fibrous web as a unitary structure. These anchors positionally fix the individual filaments of the fibrous web in relation to each other, yet permit the combination to bend. The total volume of the matrix islands over a given area of the fibrous web taken as a fraction of the fiber volume defines volumetric ratio density of the domain matrix ($V_m/V_f$).

The matrix islands of the domain matrix are not physically connected to one other, other than by filamentary material. As such, the domain matrix comprises a discontinuous polymeric material, or "island". However, as the matrix islands permanently anchor specific fiber locations, the domain matrix is a fixed structure. The discontinuous structure of the domain matrix permits a higher volume percent of fiber in the composite than a continuous matrix composition would. Additionally, a robust structure is created, i.e. the domain matrix binds the fibers in a unitary structure that is easily handled without a tendency to separate or spread.

The discontinuous structure of the domain matrix produces isolated domains within the prepreg and manufactured products therefrom. The isolated domains, leaving major sections of fibers uncoated, or without matrix material, are necessary to enhance bending of the composite. Amounts of domain matrix used must be sufficiently small to provide for an uncoated filament segment in the prepreg and resultant products, and may include those amounts that promote matrix-free areas. The volumetric ratio ($V_m/V_f$) may be as high as 0.5 as long as the fibers and polymeric material compatibly produce uncoated filament areas; however, the domain matrix is preferably present in volume ratio amounts of from about 0.4 or less, more preferably about 0.25 to about 0.02, and most preferably about 0.2 to about 0.05. By providing a spatial distribution of the matrix islands, extremely high volumes of fiber can be incorporated to form a structure which has improved physical integrity during processing and use, such as handling and cutting the composite, and stacking unidirectional prepreg tape. The resulting fibrous web structure maintains flexibility of the combined uncoated fibers within the fibrous web. By maintaining its integrity and ability to be handled, it means that the fibrous polymer composite retains its structure without yarn separation during processing and use. More than one layer of the fibrous web bound with resin can be built up to form a variety of multi-layer laminates, such as 0/90, +45/–45, +30/–30, 0/60/120, 0/45/90/135, etc. These multi-layer composite laminates have been found to be resistant to impact, and more specifically resistant to ballistic impact.

Each fibrous web section of the composite of the present invention has a spatial distribution of polymer, or matrix islands, which holds (preferably bonds) two or more filaments from the fibrous web together, providing areas with and without polymeric material.

Figure 1:
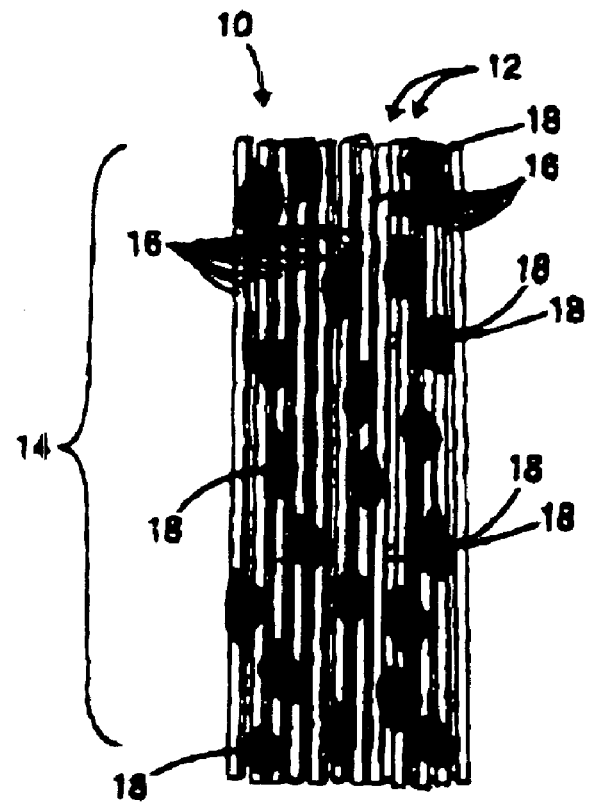
FIG. 1 is a top view of a preferred fibrous web with random matrix islands forming a uni-directional structure.

FIG. 1 illustrates a composite 10 comprising a fibrous web 12 and a domain matrix 14. The fibrous web 12 is made of filaments 16 that are unidirectionally oriented. The domain matrix 14, shown separately in FIG. 1A as comprising individual matrix islands 18, is structured within the fibrous web 12, and defined therein by the fibrous web 12. As seen in FIGS. 1 and 1A, although the domain matrix 14 binds the individual filaments 16 in relation to each other, it is the location of the filaments 16 that define the location of the matrix islands 18.

As previously stated, the domain matrix 14 is formed from the combination of the matrix islands 18 and exists as a discontinuous matrix of polymeric material. The uncoated filaments 16 fixed by matrix islands 18 permit the prepreg dimensional flexibility not previously known. The structure of the present invention allows transmission of gases and liquids. Furthermore, the matrix-free areas may be filled with other resins to achieve desired properties or characteristics of the composite.

In one embodiment, the matrix islands 18 are randomly and/or unevenly spaced within the fibrous web 12, throughout the length of the fibrous web 12. Each matrix island 18 retains the relative positions of at least two filaments 16, and may retain the relative positions of up to all of the filaments 16 in the uni-directional tape. The matrix islands 18 are preferably dimensioned to be no thicker than a bundle of filaments 16 within a web 12, as the extra polymeric material would tend to fill in the void areas of the fibrous web 12. Collectively, the random assortment of matrix islands 18 provides a supporting domain matrix 14 that holds the fibrous web 12 in a unitary structural configuration. Different sections of the fibrous web 12 may possess varying amounts of polymeric material, in size and/or spatial density of the matrix islands 18. However, a given fibrous web 12 generally possesses an average size, size distribution, average distance between matrix islands 18 and other statistical characteristics of matrix islands 18 over the entire length of the composite that provide specific properties. Sizes of the matrix islands 18 also should be relatively small in relation to the size of the impacting projectile, as smaller sized matrix islands 18 better control the designed spatial position of parallel, closely spaced filaments locally on the scale of impacting projectiles. Matrix islands 18 should be small compared to the radius of curvature desired from a specific fabric. Uncoated filaments 16 between the matrix islands 18 permit flexibility of the fibrous web 12, while areas constituting the matrix islands 18 remain as anchor points that maintain multiple filaments within the fibrous web 12 in a fixed relationship to each other. Preferably, the average size of the matrix islands is less than about 5 mm in at least one direction, more preferably less than about 3 mm, still more preferably less than about 2 mm, and most preferably less than 1 mm. Although areas with the polymer composition are not as flexible as matrix-free areas, the areas with the polymer composition preferably impart flexibility to the fibrous web 12. Most of the filament 16 lengths are preferably matrix-free, and consequently fibrous web 12 of the present invention can move more easily than a web where the fibers are fully encased in a matrix.

Figure 2:
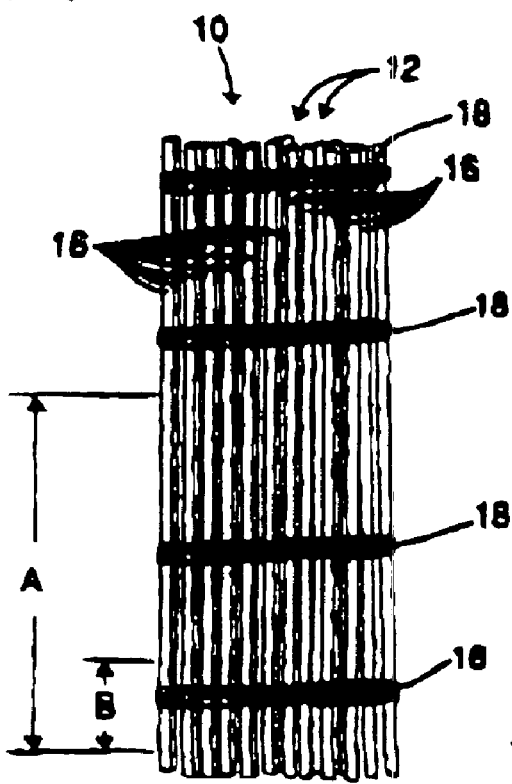
FIG. 2 is a top view of a domain matrix of non-random matrix islands bonding filaments in a unidirectional structure.

In another embodiment, shown in FIG. 2, the matrix islands 18 are evenly spaced within the fibrous web 12 within discrete domain matrix 14 areas, throughout the length of the fibrous web 12. Over extended equal lengths, shown as length A, of the fibrous web 12, the spatial density of the matrix islands 18 remains generally constant. However, over shorter lengths of the fibrous web 12, shown as length B, the spatial density of the matrix islands 18 may vary greatly. Domain matrices 14 may be continuous from one side to the other of a uni-directional tape, as shown in FIG. 2.

Figure 3:
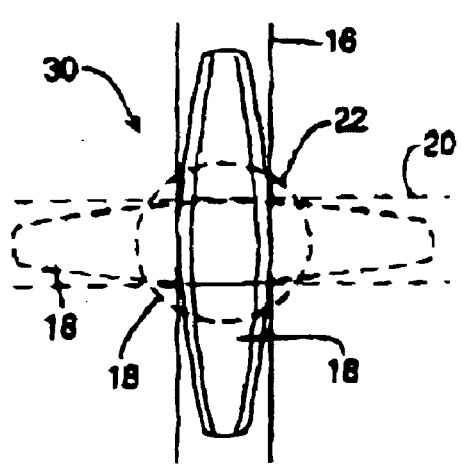
FIG. 3 illustrates a top view of the shape of the matrix islands along the length of two 90-degree cross-plied uni-directional tapes of FIG. 1.

The shape of the matrix islands 18 generally follows the surface line of the fibers, as shown in FIG. 3, with matrix island 18 on top layer filament 16 shown in solid and matrix island 18 on bottom layer filament 20 shown in phantom. The size of the matrix islands 18 between the filaments 16, on average, is an amount sufficient to bond adjacent layers and to keep structural integrity in use. The size, shape and spatial density of the matrix islands 18 within the fibrous web, or prepreg, dictate the formation of uncoated filaments within a final product. The shape of the matrix islands 18 provides the amount of flex tolerable for a given section of fibrous web 12, while still retaining functional attributes as anchor points for individual filaments 16. Although the size of individual matrix islands 18 is generally not critical, there should be a sufficient amount of matrix composition over an anchor point, on average, to provide structural integrity and strength for a given use. The spatial distribution of the matrix islands 18 provides the structural integrity in a perpendicular or other angular distortion to the direction of the filaments 16, whereas the spatial density provides distinct characteristics of the unified fibrous web 12.

Figure 3A:
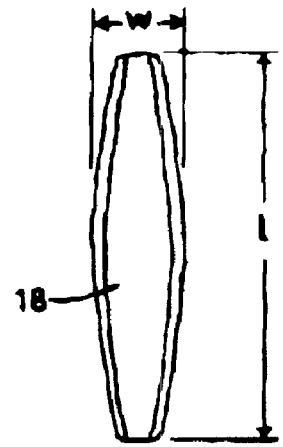
FIG. 3A illustrates a top view of the shape of a single matrix island.

As seen in FIG. 3, the shape of the individual matrix island 18 is elongated with its length dimension running with, or parallel to, the length of the filament 16. The elongated shape of the matrix islands 18 is caused by wetting phenomenon, when droplets of matrix (latex suspension in water or matrix solution) touch the filaments. The droplet then spreads in the space between the filaments, trying to reduce the surface energy. The aspect ratio, or length and width proportions (1/w) shown in FIG. 3A, of the matrix islands 18 may be useful over a broad range of amounts directed to particular uses, non-exclusively including ratios of from about 35:1 to about 1:1, about 20:1 to about 1:1, about 10 to about 1:1, and/or from about 3:1 to about 1:1. Although elongated shapes are most common, regular and irregular shapes may be used, examples of which include, without limitation, regular shapes such as donuts or atolls, rectangles, squares, circles, ellipses, etc, and irregular shapes such as asymmetric islands. With crossing filaments 20 used in a cross-plied composite structure 30, the matrix island 18 runs along the length of and attaches to both filaments 16 and 20. The diameter of the matrix island 18 at the intersection point 22 between the filament 16 and crossing filament 20 determines the adhesion of the uni-directional panels (or fibrous webs) when formed into cross-ply configurations. The uni-tape and cross-plied forms of the present invention provide highly flexible, porous structures. When uni-directional tape having a polymeric material protruding on one side is cross-plied with a second uni-directional tape, individual particles of the polymeric material are pressed into both unidirectional tapes. Resin, which preferentially flows along the fiber direction of each uni-directional tape, forms a cross shape. At each surface of an elongated domain, the elongated domain is formed with long axis parallel to the fiber direction. With a 0/90 or +45/−45 panel, elongated domains are superimposed and oriented at a right angle to each other.

Figure 4B:
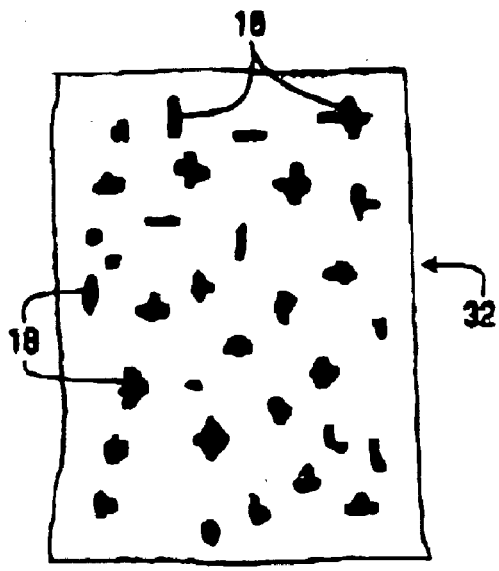
FIG. 4B shows a top view of FIG. 4A.
Figure 4A:
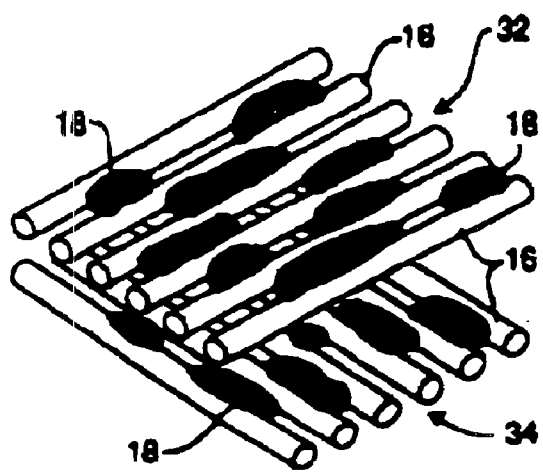
FIG. 4A shows an exploded isometric view of a cross-plied 0/90 composite structure from two layers of the structure of FIG. 1.
Figure 4C:
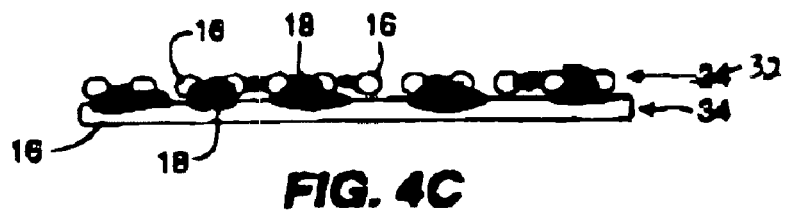
FIG. 4C shows a side view of FIG. 4A.

FIGS. 4A–4C illustrate a preferred embodiment of the uni-directional tapes of FIG. 1 formed into a cross-ply configuration. As seen in FIG. 4A, the tapes 32 and 34 are layered with their respective filaments perpendicular to one another, e.g., in a 0/90, +30/−60, or +45/−45 arrangement. Matrix islands 18, forming a domain matrix 14, bind the filaments 16 into uni-directional tapes 32 and 34, as well as bind the tapes 32 and 34 together. Additional tapes may be placed on either or both sides of the tapes 32 and 34 with the same or another orientation, such as in a −45/+45 configuration. FIG. 4B is a top view of FIG. 4A showing the top tape 32 with matrix islands 18 in a discontinuous pattern therein. FIG. 4C is a side view of FIG. 4A showing the filaments 16 of the top tape 32 and bottom tape 34 bound by matrix islands 18.

Figure 5A:
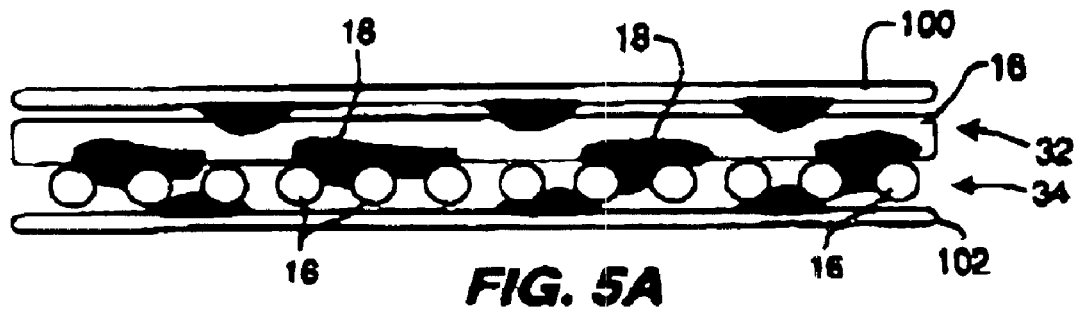
FIG. 5A shows a side view of FIGS. 4A–4C with an outer film layer.
Figure 5B:
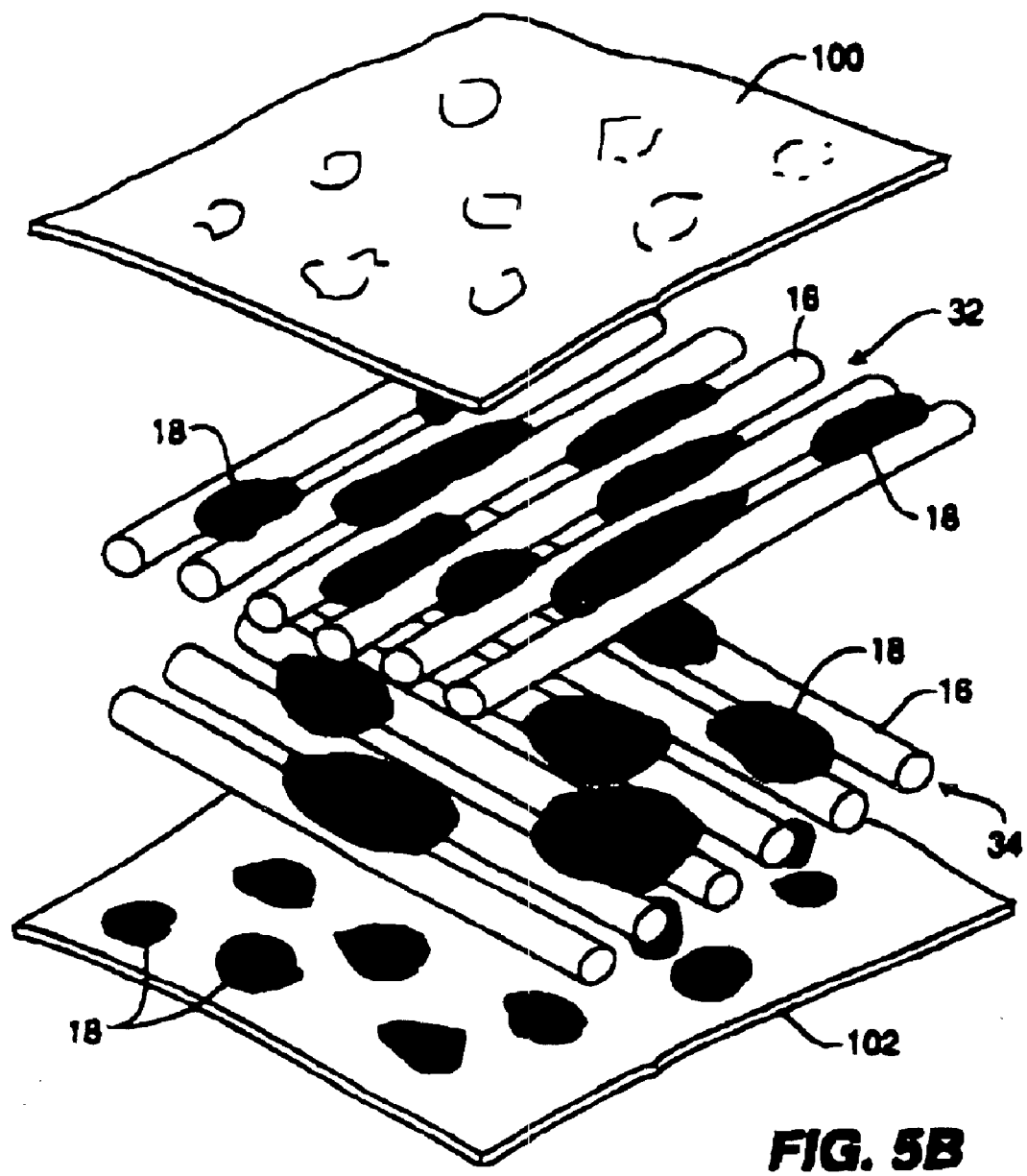
FIG. 5B shows an exploded isometric view of FIG. 5A.

As seen in FIGS. 5A and 5B, in some cases it is desirable to have a surface film on the panels to reduce the possibility of catching single fibers or filaments and damaging the panels in normal handling. FIG. 5A shows a side view of a top tape 32 and a bottom tape 34 made of filaments 16 placed between two films 100 and 102. Tapes 32 and 34 and films 100 and 102 are bound together by matrix islands 18, that collectively form a domain matrix of the composite. FIG. 5B is an exploded isometric view of FIG. 5A, showing the tapes 32 and 34 fixed by the matrix islands 18, with top 100 and bottom 102 films also fixed by the matrix islands 18. For maximum flexibility, the films are preferably thin and spot bonded to the tapes.

Figure 6:
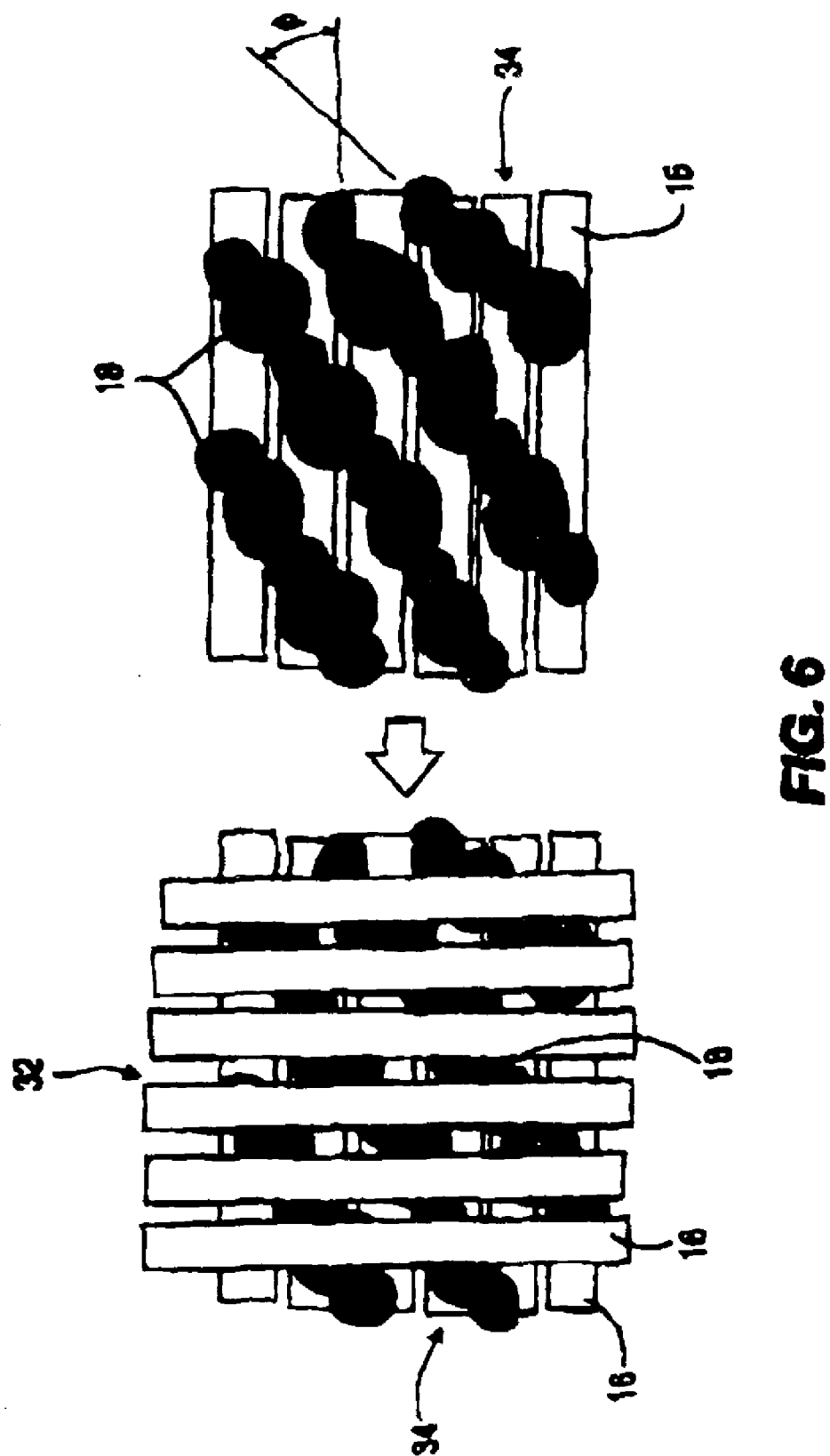
FIG. 6 shows a top view of a cross-plied structure of the uni-directional tapes.

FIG. 6 shows a cross-plied structure with the matrix islands 18 extending across the width of the tape 34. The extended matrix islands 18 remain discontinuous from one another even with the application of a second tape 32. Highly elongated narrow matrix domains 14 crossing as straight lines over the whole multitude of parallel fibers in the unidirectional tape are perpendicular to the set of fibers or at an angle ($\phi$), preferably from about 10 degrees to about 170 degrees, more preferably from about 30 degrees to about 150 degrees, or as curved lines including patterns created by multiple circles, ellipses, ovals and geometric figures.

The high strength fibers of the present invention preferably have a tensile modulus of at least about 160 g/denier and a tenacity of at least about 7 g/denier in a suitable polymeric or domain matrix 14. The polymer composition of the domain matrix 14 may comprise an elastomer, thermoplastic elastomer, thermoplastic, thermoset, and/or combinations or blends thereof Preferably the polymer composition comprises an elastomeric matrix material. The fiber is tested according to ASTMD 2256 using 4D tire and cord clamps, on an Instron.RTM. testing machine at an elongation of 100%/minute. It is preferred to have the elastomeric composition with a tensile modulus of less than 20,000 psi, preferably less than 6000 psi measured according to ASTM D638-84 at 25° C.

The filaments 16 of the present invention are elongated bodies of considerable length dimension in relation to their transverse dimensions of width and thickness. The term fiber non-exclusively includes a monofilament, multifilament, yarn, ribbon, strip, and the like structures having regular or irregular cross-sectional areas. The fibrous web 12 for purposes of the present invention comprises any group of fibers useful to make uni-directional tape and/or cross-plied structures. The preferred fibrous web 12 comprises highly oriented ultra high molecular weight polyethylene fiber, highly oriented ultra-high molecular weight polypropylene fiber, aramid fiber, polyvinyl alcohol fiber, polyacrylonitrile fiber, polybenzoxazole (PBZO) fiber, polybenzothiazole (PBZT) fibers, fiberglass, ceramic fibers or combinations thereof Ultra-high molecular weight polyethylene's are generally understood to includes molecular weights of from about 500,000 or more, more preferably from about 1 million or more, and most preferably greater than about 2 million, up to an amount of approximately 5 million. The tensile modulus of the fibers, as measured by an Instron tensile testing machine, is ordinarily at least about 300 g/denier, preferably at least about 1,000 g/denier and most preferably at least about 1,500 g/denier. The tenacity of the fibers is ordinarily at least about 15 g/denier, more preferably at least about 25 g/denier, still more preferably at least 30 g/denier, and most preferably at least about 35 g/denier. Ultra-high molecular weight polypropylenes range in weight average molecular weight of from about 750,000 or more, more preferably from about 1 million or more, and most preferably greater than about 2 million. As polypropylene is a much less crystalline materials than polyethylene and contains pendant methyl groups, tenacity values achievable with polypropylene are generally substantially lower than the corresponding values for polyethylene. A suitable tenacity for polypropylene may range from at least about 8 g/denier, with a preferred tenacity being at least 11 g/denier. The tensile modulus for polypropylene is at least about 160 g/denier, preferably at least about 200 g/denier. The melting point for polypropylene is generally raised several degrees by the orientation process, such that the polypropylene fiber preferably has a main melting point of at least about 168° C., more preferably at least about 170° C.

Aramid fiber is formed principally from aromatic polyamides. Aromatic polyamide fibers having a modulus of at least about 400 g/denier and tenacity of at least about 18 g/denier are useful for incorporation into composites of this invention. Exemplary aramid fibers include poly(phenylenediamine terephthalamide) fibers produced commercially by DuPont Corporation of Wilmington, Del. under the trade names of Kevlar® 29, Kevlar® 49 and Kevlar® 129.

Polyvinyl alcohol (PV-OH) fibers are useful at weight average molecular weights of at least about 100,000, preferably at least 200,000, more preferably between about 5,000,000 and about 4,000,000 and most preferably between about 1,500,000 and about 2,500,000. Usable PV-OH fibers should have a modulus of at least about 60 g/denier, preferably at least about 200 g/denier, more preferably at least about 300 g/denier, and a tenacity of at least about 7 g/denier, preferably at least about 10 g/denier and more preferably at least about 14 g/denier and most preferably at least about 17 g/denier. PV-OH fibers having a weight average molecular weight of at least about 500,000, a tenacity of at least about 200 g/denier and a modulus of at least about 10 g/denier are particularly useful in producing ballistic resistant composites. PV-OH fibers having such properties can be produced, for example, by the process disclosed in commonly assigned U.S. Pat. No. 4,559,267 to Kwon et al.

Detail on filaments of polybenzoxazoles (PBZO) and polybenzothiazoles (PBZT), may be found in "The Handbook of Fiber Science and Technology: Volume II, High Technology Fibers," Part D, edited by Menachem Lewin, hereby incorporated by reference.

Polyacrylonitrile (PAN) fibers having a molecular weight of at least about 400,000, and preferably at least 1,000,000 also may be employed. Particularly useful are PAN fibers having a tenacity of at least about 10 g/denier and an energy to break of at least about 22 joule/g. PAN fiber having a molecular weight of at least about 400,000, a tenacity of at least about 15–20 g/denier and an energy to break of at least about 22 joule/g is most useful in producing ballistic resistant articles, with such fibers are disclosed, for example, in U.S. Pat. No. 4,535,027.

For purposes of this invention, a fibrous layer comprises at least one fibrous web of fibers either alone or with a matrix. Fibers include one or more filaments 16. Fiber denotes an elongated body, the length dimension of which is much greater than the transverse dimensions of width and thickness. Accordingly, the term fiber includes monofilament, multifilament, ribbon, strip, staple and other forms of chopped, cut or discontinuous fiber and the like having regular or irregular cross-sections. The term fiber includes a plurality of any one or combination of the above.

The cross-sections of filaments for use in this invention may vary widely. They may be circular, flat or oblong in cross-section. They also may be of irregular or regular multi-lobal cross-section having one or more regular or irregular lobes projecting from the linear or longitudinal axis of the fibers. It is particularly preferred that the filaments be of substantially circular, flat or oblong cross-section, most preferably the former.

The fibers may be arranged in fibrous webs having various configurations. By fibrous web is meant a network or plurality of fibers arranged into a predetermined configuration or a plurality of fibers grouped together to form a twisted or untwisted yarn, which yarns are arranged into a predetermined configuration. For example, the fibers or yarn may be formed as a felt or other nonwoven, knitted or woven (plain, basket, satin and crow feet weaves, etc.) fabric, arranged in a parallel array, layered, or formed into a fabric by any of a variety of conventional techniques. Among these techniques, for ballistic resistance applications, we prefer to use parallel arrays wherein the fibers are flattened to spread out individual filaments into essentially a single layer. Cut or slash resistant applications may use other fiber array configurations. According to a particularly preferred network configuration, the fibers are unidirectionally aligned so that they are substantially parallel to each other along a common fiber direction. Continuous length fibers are most preferred although fibers that are oriented and have a length of from about 3 to 12 inches (about 7.6 to about 30.4 centimeters) are also acceptable and are deemed "substantially continuous" for purposes of this invention.

Both thermoset and thermoplastic resin particles, alone or in combination, may be used with the present invention. The preferred thermosets include epoxies, polyesters, acrylics, polyimides, phenolics, and polyurethanes. The preferred thermoplastics include nylons, polypropylenes, polyesters, polycarbonates, acrylics, polyimides, polyetherimides, polyaryl ethers, and polyethylene and ethylene copolymers. Thermoplastic polymers possess improved environmental resistance, fracture toughness, and impact strength over thermosetting materials. Prepregs having thermoplastic domain matrices have extended shelf life, and greater resistance to environmental storage concerns. The high viscosity of thermoplastic polymers does not affect the discontinuous application of the polymeric material into the fibrous web 12. Even at significantly increased amounts, thermoplastic prepregs of the present invention are flexible structures. Prepregs containing thermosetting domain matrices 14 are relatively flexible and tacky prior to reaction.

The domain matrices may contain polymeric material from polymeric powders, polymeric solutions, polymeric emulsions, chopped filaments, thermoset resin systems, and combinations thereof Applications of these polymeric materials may be by spray, droplets, emulsion, etc. When chopped filaments are used, heat and/or pressure can be used to consolidate the uni-tape and/or a multi-layer panel, and the chopped filaments should melt at a temperature below that of the filaments 16 in the uni-tape. For example, a flexible structure may be prepared using a fibrous web 12 of 215 denier Spectra® 1000 fiber together with a powder of either Kraton® D1650 or with a powder of LDPE (low density polyethylene) or LLDPE (linear low density polyethylene) with molding carried out at 120° C. As such, the need for polyethylene film, commonly used with commercial single elements, may be eliminated.

The fibers, premolded if desired, may be precoated with a polymeric material (preferably an elastomer) prior to being arranged in a network as described above. The elastomeric material which can also be used as the matrix has a tensile modulus, measured at about 23° C., of less than about 20,000, preferably less than 6,000 psi (41,400 kPa). Preferably, the tensile modulus of the elastomeric material is less than about 5,000 psi (34,500 kPa), and most preferably is less than about 2,500 psi (17,250 kPa) to provide even more improved performance. The glass transition temperature ($T_g$) of the elastomer of the elastomeric material (as evidenced by a sudden drop in the ductility and elasticity of the material) remains flexible under field or working conditions, including less than about 25° C., or less than about 0° C. The $T_g$ of the elastomer may range less than about −40° C., or less than about −50° C., when desired. The elastomer should have an elongation to break of at least about 50%. Preferably, the elongation to break is at least about 100%, and more preferably, it is about 150%.

Any elastomeric material suitable for creating domain matrices may be used for the present invention. Representative examples of suitable elastomers of the elastomeric material have their structures, properties, and formulations together with cross-linking procedures summarized in the Encyclopedia of Polymer Science, Volume 5, "Elastomers-Synthetic" (John Wiley and Sons Inc., 1964). For example, any of the following materials may be employed: polybutadiene, polyisoprene, natural rubber, ethylene-propylene copolymers, ethylenepropylene-diene terpolymers, polysulfide polymers, polyurethane elastomers, chlorosulfonated polyethylene, polychloroprene, plasticized polyvinylchloride using dioctyl phthalate or other plasticers well known in the art, butadiene acrylonitrile elastomers, poly(isobutylene-co-isoprene), polyacrylates, polyesters, polyethers, fluoroelastomers, silicone elastomers, thermoplastic elastomers, copolymers of ethylene. Particularly useful elastomers are block copolymers of conjugated dienes and vinyl aromatic monomers. Butadiene and isoproprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type A-B-A, multi-block copolymers of the type (AB)n(n=2–10) or radial configuration copolymers of the type R-(BA)x(x=3–150): wherein A is a block from a polyvinyl aromatic monomer and B is a block from a conjugated diene elastomer. Many of these polymers are produced commercially by the Shell Chemical Co. and described in the bulletin "Kraton Thermoplastic Rubber", SC-68-81.

Most preferably, the elastomeric material contains one or more of the above noted elastomers. The low modulus elastomeric material may also include fillers such as carbon black, silica, glass micro-balloons, etc. up to an amount not to exceed about 300% by weight of elastomer, preferably not to exceed about 100% by weight, and may be extended with oils and vulcanized by sulfur, peroxide, metal oxide, or radiation cure systems using methods well known to rubber technologists of ordinary skill. Blends of different elastomeric materials may be used together or one or more elastomeric materials may be blended with one or more thermoplastics. High density, low density, and linear low density polyethylene may be cross-linked to obtain a material of appropriate properties, either alone or as blends.

The proportion (volume percent) of polymeric material to the fibers or fabrics varies according to the rigidity, shape, heat resistance, wear resistance, flammability resistance and other properties desired. Other factors that affect these properties include the spatial density of the domain matrix, void percentage within the fibrous web, randomness of the matrix islands, and other such variables related to the placement, size, shape, positioning and composition of the polymer materials and fibers.

Figure 7:
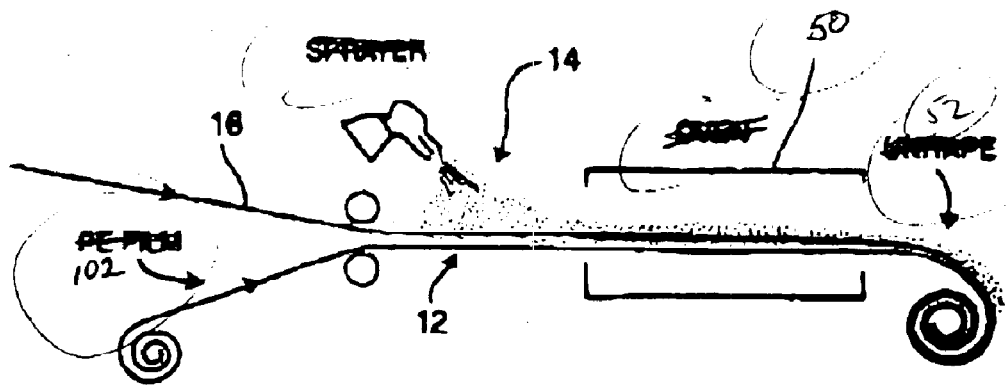
FIG. 7 is an illustration of a preferred method of making the composite of the present invention; and, FIG. 8 is an illustration of an alternative preferred method of making the composite of the present invention.

A specific and preferred method to make the composite of the present invention is illustrated in FIG. 7. This is a method of making a composite comprising a fibrous web wherein the fibers are unidirectionally oriented. The filaments 16 are rolled onto a polyethylene film 102 to form a fibrous web 12. A latex of elastomer, thermoplastic elastomer, or thermoplastic precursor for a domain matrix 14 is sprayed onto the fibrous web 12. Once sprayed, the fibrous web 12 with domain matrix 14 precursor is fed into an oven 50 to provide bonding between the fibrous web 12 and domain matrix 14 precursor. Once cooled, a uni-directional tape 52 is formed. Polymeric solutions may be used in a similar fashion. Thermoset resins and monomers may be sprayed onto the fibrous web 12 and subsequently reacted. Masks or templates may be used to control the pattern of the domain matrices 14, such as using a series of parallel wires to screen continuous lengths having a narrow width of less than 200 microns. Additionally, geometry's used to create flexible structures by use of three sets of parallel seams may be employed, as disclosed in U.S. Pat. Nos. 5,316,820 and 5,362,527, the disclosures of which are incorporated by reference. However, any method may be used with any fibrous web.

Figure 8:
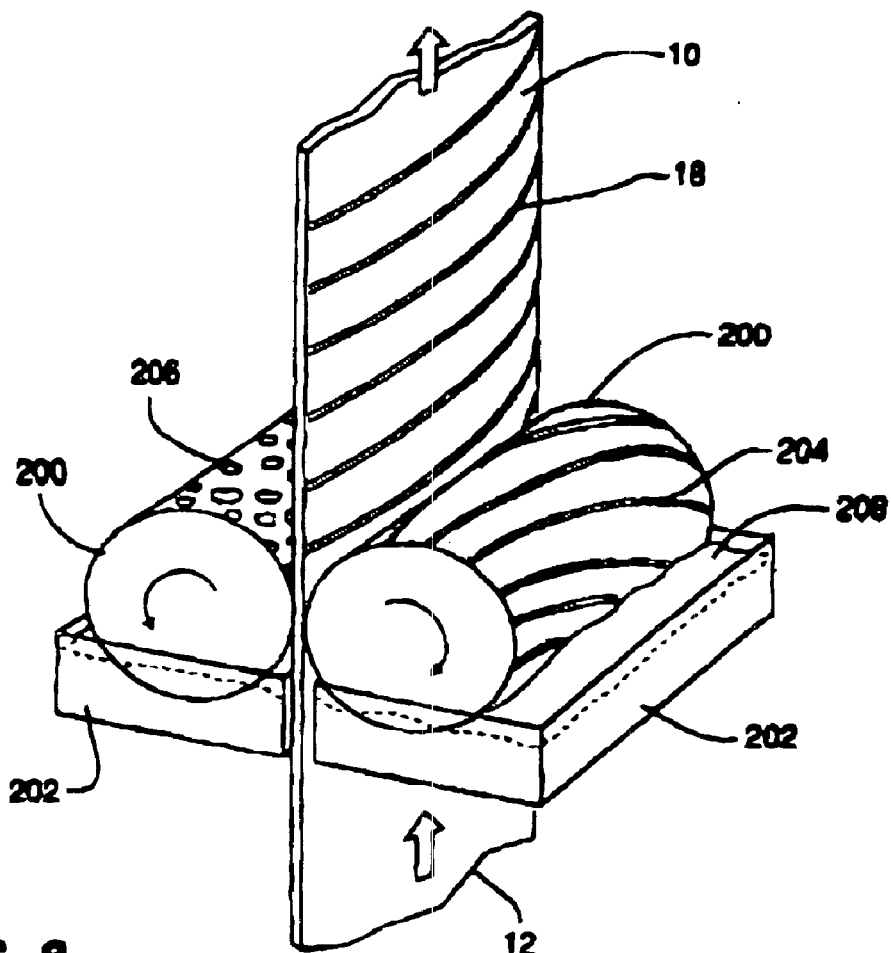

Alternatively, a polymeric latex may be applied on the fibrous web 12 and subsequently bonded to the fibrous web 12 with heat and/or pressure. The fiber web 12 may be contacted with pressure rolls 200 that are fed from containers 202 of latex 208, as shown in FIG. 8. The fibrous web 12 is passed into the nip between pressure rolls 200. The pressure rolls 200 dip into the containers 202 and latex 208 adheres to the patterns, such as non-interrupted lines 204 or spots 206, on the pressure rolls 200. As the uni-directional tape is contacted with the latex 208 coated patterns of the pressure rolls 200, the polymer transfers onto the fibrous web 12 to form matrix islands 18. The fibrous web 12, with the attached matrix islands 18 may then be heated, if desired.

Limited amounts of polymer are collected into the fibrous web 12. The amounts are such that polymer-free areas are formed into the prepreg, or tape, and final product therefrom. Generally the amount of polymer ranges from about 50% or less, preferably about 20% or less, more preferably about 20% to about 2%, still more preferably about 15% to about 5%, and most preferably about 10% to about 5% of the surface area of the filaments 16 in the fibrous web 12.

The discontinuous distribution of the matrix composition can be attained by other means. For example the present invention includes spot laminating a fibrous web with at least one non-continuous layer of polymer. This could be applied by feeding polymer onto the first layer in a discontinuous fashion or by using a perforated or pattern layer wherein there are areas without polymer and areas with polymer, i.e. holes. The discontinuous polymeric layer can be laminated with the fibrous web under heat and pressure to result in discontinuous domain matrix in the fibrous web. This results in the fibrous web being positionally fixed by the domain matrix such that discrete matrix islands are formed with voids areas therebetween. The composite may contain as little as 2 volume percent resin (matrix) distributed sufficiently to enable the fibrous web to maintain its integrity despite the high volume percent of fiber, or as much as 50 volume percent resin distributed sufficiently to form voids between the filaments of the fibrous web.

The matrix may be applied to the fibrous web in a variety of ways, such as a liquid, a sticky solid or particles in suspension, or as a fluidized bed. Alternatively, the matrix may be applied as a solution or emulsion in a suitable solvent which does not adversely affect the properties of the fibrous web. Suitable applications of the matrix include printing, spraying, slurry, powders by electrostatic methods, and/or other suitable matrix applications, with the type of application of a particular situation being determinable by those skilled in the art. While any liquid capable of dissolving or dispersing the matrix polymer may be used, preferred groups of solvents include water, paraffin oils, ketones, alcohols, aromatic solvents or hydrocarbon solvents including paraffin oil, xylene, toluene and octane. The techniques used to dissolve or disperse the matrix polymers in the solvents will be those conventionally used for the coating of similar elastomeric materials on a variety of substrates.

Other techniques for applying the polymer (matrix) to the fibers may be used, including coating of the high modulus precursor (gel fiber) before the high temperature stretching operations, either before or after removal of the solvent from the fiber. The fiber may then be stretched at elevated temperatures to produce the coated fibers. The gel fiber may be passed through a solution of the appropriate coating polymer (solvent may be paraffin oil, aromatic or aliphatic solvent) under conditions to attain the desired coating. Crystallization of the high molecular weight polyethylene in the gel fiber may or may not have taken place before the fiber web passes into the cooling solution.

The fibers and networks produced therefrom are formed into composite materials as the precursor or prepreg to preparing the composite articles. The low areal density prepregs of the present invention may be used to create consolidated panels which provide excellent ballistic protection. The term composite is intended to mean combinations of fiber or fabric with polymeric material in the form of matrix islands, which may include other materials such as fillers, lubricants or the like as noted heretofore.

Additional methods to fix domain matrices 14 may include, without limitation, hot melt, solution, emulsion, slurry, surface polymerization, fiber commingling, film interleaving, electroplating, and/or dry powder techniques.

Composite materials may be constructed and arranged in a variety of forms. It is convenient to characterize the geometry's of such composites by the geometry's of the fibers and then to indicate that the matrix material may occupy part or all of the void space left by the network of fibers. One such suitable arrangement is a plurality of layers of laminates in which the coated fibers are arranged in a sheet-like array and aligned parallel to one another along a common fiber direction. Successive layers of such coated, unidirectional fibers can be rotated with respect to the previous layer. An example of such laminate structures are composites with the second, third, fourth and fifth layers rotated +45°, −45°, 90°, and 0°, with respect to the first layer, but not necessarily in that order. Other examples include composites with alternating layers rotated 90° with respect to each other, e.g., 0/90, +45/−45, +30/−60, etc. The present invention includes composites having a plurality of layers. There can be from 1 to 500, preferably 2 to 100 and more preferably 2 to 75 layers.

The normal technique for forming laminates includes the steps of arranging coated fibers into a desired network structure, and then consolidating and heating the overall structure to cause the coating material to flow and occupy a fraction of the void spaces, thus producing a continuous matrix. Another technique is to arrange layers or other structures of coated or uncoated fiber adjacent to and between various forms, e.g. films, of the matrix material and then to consolidate and heat set the overall structure. In the above cases, it is possible that the matrix can be caused to stick or flow without completely melting. In general, if the matrix material is only heated to a sticking point, generally more pressure is required. Also, the pressure and time to set the composite and to achieve optimal properties will generally depend on the nature of the matrix material (chemical composition as well as molecular weight) and processing temperature. For purposes of the present invention, substantial void (matrix-free) volume must remain.

Multiple tapes containing the composite 10 of the present invention may be combined together. U.S. Pat. Nos. 5,061,545 and 5,093,158 disclose various combinations of two layer composites wherein the fibers in each layer are unidirectional fibers. The fibers of adjacent layers are disclosed to be at an angle of from 45 to 90 from each other, with the preferred angle between fibers in adjacent layers being about 90° from each other. The disclosures of U.S. Pat. Nos. 5,061,545 and 5,093,158 are herein incorporated by reference.

Composites of the present invention may possess an unusually high fiber content of 90 to 98 percent by volume and have improved ballistic effectiveness compared to composites having a continuous polymeric matrix. In addition to being useful in commonly known articles designed to resist ballistic impact, such as bulletproof vests, helmets and body armor, the present invention is particularly effective against explosives and/or very high velocity impacts of as much as approximately 7 kilometers per second, and has utility in a space environment where ballistic impacts with micrometeorites may occur.

EXPERIMENTAL PROCEDURES

Step A. Preparation of Dry Fiber Webs

Yarn was wound onto a rotating drum of a filament winder. The drum was 30 inches (76 cm) in diameter, 48 inches (122 cm) long and was covered with Halar® film, a copolymer of chloro, trifluoro ethylene, and ethylene, a product made by AlliedSignal Specialty Films of Pottsville, Pa., prior to winding. Strips of 2 inch (5.08 cm) wide double stick tape were applied parallel to the axis of the drum at 10 inch (25.4 cm) intervals, center to center. Yarn was wound on top of the tape. Single stick (coated) masking tape was applied over the yarn-covered double stick tape to ensure all filaments were held in place. The yarn-covered Halar® film was cut off the drum and cut apart along the center line of each tape. The result was a supply of dry parallel yarns, 8 inches (20.3 cm) long, backed by Halar® film and held in place by 1 inch (2.45 cm) wide tape at either end.

B. Preparation of the Experimental Shield Panels

The 8 inch (20.3 cm) long sections of step A, above, were placed on top of a metal sheet and taped in place to hold the yarns straight. A matrix resin was applied (see Examples for details), and a second 8 inch (20.3 cm) section was placed over the first 8 inch (20.3 cm) section, that was turned 90 degrees with respect to the fiber orientation, with the Halar® film on top. An ⅛ inch (0.3175 cm) thick aluminum plate, 7.5 in.×7.5 in. (19 cm×19 cm), was centered on the yarns and the assembly was placed in a hydraulic press at 120° C., 3 tons force, for 10 minutes. The metal plate acted as a spacer to clear the press platens of the tapes surrounding the fiber webs.

C. Measurement of Flexibility of the Panels

For body armor application, panels of the present invention should have flexibility similar to or greater than conventional ballistic resistant fabric structures. A simple test to determine a measure of flexibility is to place a square panel on a flat surface and allow one side to overhang an edge (panel side parallel to edge) by length (l). The vertical distance (h) for the flat surface to the unsupported side of the panel is measured and the value of (h/l) is calculated. When h/l is equal to 1 the panel is extremely flexible, and when h/l is equal to zero the panel is extremely rigid. To compare flexibility of a panel with that of control fabric, the percent flexibility is calculated as:

$$100\% \times (h/l)_{panel}/(h/l)_{fabric} = \% \text{ flexibility.}$$

For body armor, it is desirable for panels to have percent flexibility from about 50% to about 150% of the control ballistic resistant woven fabric without matrix, preferably from about 70% to about 150%, and more preferably from about 85% to about 150%, as described in Example 10.10 below. Preferably the h/l is from about 0.7 or greater, more preferably from about 0.85 or greater.

EXAMPLE 1

Fibers of Spectra® 1000 (215 denier, 60 filaments per end), commercially available from AlliedSignal Inc. of Petersburg, Va. (40 ends per inch (EPI) and nominal areal density (AD) of 0.00376 gm/cm$^2$), and a matrix resin of Kraton® rubber, type G1650, granular, manufactured by Shell Chemical Co. of Houston, Tex. (particles were passed through a #30, 600 micrometer or 0.0234 inch screen) were used in the experimental procedure listed above. The matrix resin was used with 7.5 wt % (total) scattered over the bottom web before cross-plying. After molding, the matrix resin became spot connecting islands of filaments within the fiber strand, and between fiber strands. The panel was initially paper-like, but resembled flexibility of fabric after crimping and flexing.

EXAMPLE 2

Example 1 was repeated with a matrix resin of 15 wt %. The results were the same as Example 1, however the panel was more robust and more resilient to de-lamination.

EXAMPLE 3

Example 1 was repeated with a matrix resin of 20 wt % and an added ply of polyethylene film, 0.00035 inch (0.000889 cm) thick, manufactured by Raven Industries of Sioux City, S. Dak. was placed on the outside of both fiber webs (Halar® film was removed, and release paper was placed over the PE film prior to pressing). The panel had a robust structure with good flexibility.

EXAMPLE 4

Fibers of Spectra® 1000/215/60 (40 ends per inch (EPI) and nominal areal density (AD) of 0.00376 gm/cm$^2$) and a matrix resin of Prinlin B7137X-1, an aqueous dispersion of Kraton® D1107 rubber, manufactured by Pierce & Stevens of Buffalo, N.Y., were used in the experimental procedure listed above. Both fiber webs were sprayed with fine droplets of the Prinlin and dried before molding, giving 85 weight percent of fiber. The panel was initially paper-like, but resembled flexibility of fabric after crimping and flexing.

EXAMPLE 5

Fibers of Spectra® 1000/215/60 (40 ends per inch (EPI) and nominal areal density (AD) of 0.00376 gm/cm$^2$) and a diluted matrix resin of 3 parts water and 1 part Prinlin B7137X-1 were used in the experimental procedure listed above. Both fiber webs were sprayed with fine droplets of the Prinlin and dried before molding, giving 95 weight percent of fiber. The panel was initially paper-like, but resembled flexibility of fabric after crimping and flexing. The panel was less robust than the panel of Example 4.

EXAMPLE 6

Fibers of Spectra® 1000/215/60 (40 ends per inch (EPI) and nominal areal density (AD) of 0.00376 gm/cm$^2$) and a matrix resin of polyethylene roto-molding powder S3DSBK, 120 micron/fines, manufactured by PFS Thermoplastic Powder Coatings Inc. of Big Spring, Tex., were used in the experimental procedure listed above. The PE was dusted over the lower fiber web before cross-plying by shaking, with the PE amount estimated after molding as 14 wt % of the total wt. The panel was initially paper-like, but became fabric-like with manipulation. A low friction surface was produced.

EXAMPLE 7

Fibers of Spectra® 1000/215/60 (40 ends per inch (EPI) and nominal areal density (AD) of 0.00376 gm/cm$^2$) and a single polyethylene film, 0.00035 inch (0.000889 cm) thick, manufactured by Raven Industries, was placed between the two fiber webs to serve as a control for Example 6. The panel was less flexible than the panel of Example 6, but was deemed useful.

EXAMPLE 8

Fibers of Spectra® 1000/215/60 (40 ends per inch (EPI) and nominal areal density (AD) of 0.00376 gm/cm$^2$) were used with no matrix resin. After molding the panel showed paper-like quality and fell apart when manipulated.

EXAMPLE 9

Fibers of Spectra® 1000/1300, 240 filaments per end, a product of AlliedSignal Inc., (9.25 ends per inch (EPI), nominal areal density (AD) of 0.005266 gm/cm$^2$), were sprayed with a matrix resin of Prinlin B7137X-1and processed according to the experimental procedure listed above, with drying before molding, to give 78 weight percent of fiber. The panel was significantly more flexible than similar continuous fiber matrix products, which had equivalent fiber areal density.

EXAMPLE 10

Examples 10.1–10.3:

Thermoplastic elastomer monofilaments were created by extruding a mixture of two thermoplastic elastomers (Kraton® G1652 and 1657) in the weight ratio of 2:1. Elastomeric fibers of 650 and 1300 denier were formed into uni-directional tapes as follows: Halar® film was placed onto a drum with 2 inch (5.08 cm) wide double-sided adhesive tape affixed at 19 inch (48.26 cm) intervals, center to center, along the length direction. The thermoplastic elastomer fibers were wound to give 4.6 ends per inch (1.81 ends/cm) of width. One-sided adhesive tape was attached over the position of the double-sided tape to anchor the fiber ends in place. The anchoring tapes were slit down the middle giving webs with 17 inch (43.18 cm) length of usable unidirectional fiber mat where the filaments are held together by isolated rubber strips. The webs were slit at 17 inch (43.18 cm) intervals along the length direction to produce 17 inch (43.18 cm) squares of uni-directional fiber mat having considerable spacing between monofilaments. Uni-directional Spectra® fiber tapes were prepared in the same manner, except that the 1300 denier Spectra® 1000 was wound 2.6 ends per inch (1.02 ends/cm) onto the drum. Stabilized composite panels were prepared by cross-plying a rubber mat with a Spectra® tape and molding them together at 100° C. for 5 minutes at a pressure of 10 tons per square ft (1.076×10$^5$ kg/m$^2$). The stabilized panels were then cross-plied, the Halar® film was removed, and then the panels were molded together (same conditions as used to construct the stabilized uni-directional tape) with the resin rich sides of the stabilized uni-directional tape facing each other. The results are shown below in Table1.

TABLE 1

Comparative Ballistic Performance of Flexible Armor at Areal Density of 1 kg/m$^2$ Against .38 Caliber Lead Bullets - Rubber Grid Reinforcement

| Sample | Matrix (kg/m$^2$) | Fiber wt % | No. of Panels | V$_{50}$ (ft/s) | SEAT (Jm$^2$/kg) |
|---|---|---|---|---|---|
| #10.1 (4.6 ends/in) | 1.04 | 81 | 8 | 890 | 377 |
| #10.2 (2.3 ends/in) | 1.05 | 80 | 8 | 807 | 295 |
| #10.3 (4.6 ends/in) | 1.24 | 66 | 8 | 802 | 247 |

Comparison of 10.1 and 10.2 shows that the fiber grid is more effective at the same weight percent elastomeric grid. Additional elastomeric grid causes panels to become stiff and less ballistically effective (10.3). Results indicate that grid weight percent and size need to be optimized for optimum protection against a specific ballistic threat.

10.4:

Comparative Example

A comparative example of a parallel fiber web (a commercial product of AlliedSignal and sold under the trade name of Spectra Shield® single element, 1300 denier yarn of Spectra® 1000 fibers, 240 filaments per yarn) is coated with a Kraton® D1107 solution in cyclohexane. It evenly coats the parallel fiber web, which passes through a drying chamber to remove solvent to produce a uni-directional tape material. This material is cross-plied and polyethylene film is laminated onto the top and bottom surface to prevent panels from sticking together. Areal density of the panel, fiber, matrix, and PE film were 0.147, 0.105, 0.0262, and 0.0157 kg/m$^2$, respectively. The PE film had a melting point of 114° C.

10.5:

A Halar® film, manufactured by AlliedSignal Specialty Films, was wrapped around a drum 4 feet long (121.92 cm) and 30 inches (76.2 cm) in diameter. The drum was rotated and Spectra® 1000 fiber (1300 denier) was wrapped at 9.26 ends per inch (3.65 ends/cm). The fiber web was sprayed with a latex (Kraton® D1107: rosin in wt. ratio 3:1, Prinlin B7137X-1, a product of Pierce and Stevens). This unidirectional tape, together with the Halar backing was cut up into 15 inch (38.1 cm) squares and cross-plied 0/90 with latex on the inside. The panel was then molded at 125° C. for 15 minutes at 10 tons/ft$^2$ (1.076×10$^5$ kg/m$^2$), giving 81 weight percent of fiber. The Halar® film was removed and the polyethylene film (same as used in Example 10.4) was placed on the outside of the 0/90 panel and the entire assembly molded as previously described, except molding time was 2 minutes.

10.6:

This sample was constructed to be similar to Example 10.5, except that a polyethylene film (identical to the film on panels of Example 10.5) was wrapped onto a metal drum (4 ft. (121.92 cm) in length and 30 inches (76.2 cm) in diameter and a latex was sprayed onto its surface in circular domains of elastomer having a band width of 125 to 250 microns and covering approximately 25% of the film surface. Spray process was carried out with a Wagner Power Painter-Model 3 10 using 0.8 mm nozzle. Spraying began at one end of the rotating drum and proceeded to the other end, producing individual circular domains of Kraton D1107. Spectra 1000 fiber was wound in an identical manner as described in Example 10.5. A robust uni-directional tape was produced. A series of 0/90 panels were molded having the polyethylene fiber on the surface. Molding was carried out at 80° C., 95° C., 105° C. and 130° C. for 15 minutes at 10 tons/square ft ($1.076 \times 10^5$ kg/m$^2$). As molding temperature increased the panels became more paper-like and less fabric-like in flexibility. One 0/90 panel was molded against an array of washers (0.075 inches (0.191 cm) thick, outer diameter 0.87 inches (2.21 cm), and inner diameter 0.37 inches (0.94 cm)). Fully consolidated washer shapes were imprinted into the panels. This demonstrated that patterns of consolidation can be generated from panels of this invention. Useful domain structures can be constructed to provide continuous lines that are easily folded (such as equilateral triangle arrays). Eight panels, molded at 95° C., were designated as Example 10.6 and tested against 0.38 caliber lead bullets. In addition, one panel was placed in a spot bonding mold having a square grid with raised circular section at grid intersections. Circular sections were 1.0 mm in diameter and center-to-center distance was 7 mm. The panel was placed in a press at approximately 500 psi and molded for 150 seconds at 115° C. The panel remained flexible. Clearly, a wide variety of patterns can be created by this molding technique.

10.7:

This sample was created in the same manner as Example 10.6, except that 1500 denier aramid fiber, Twaron fiber (a product of Akzo, 1450 denier yarn, 1.5 denier per filament, tensile strength 24.4 g/denier, modulus 805 g/denier), was wound onto the rotating drum 8.03 ends per inch (3.16 ends/cm). Circular domains were created on the polyethylene film similar to those in Example 10.6. The domains created by spraying onto the fiber web were also distorted in the same manner as in Example 10.6. Scanning electron microscopy indicated that the coated domains were discontinuous. The domains were much longer in the direction parallel to fiber length (1), with dimensions varying from 150 microns to 500 microns in this direction. The L/D ratio varied from 3 to 1 to 25 to 1 for these domains.

10.8:

Thermoplastic elastomeric fibers were created by extruding a mixture of Kraton® G1652 and 1657 in the weight ratio of 2:1. Uni-directional tapes made with elastomeric fibers (650 denier) were formed in the following manner:

Thermoplastic elastomer monofilaments were created by extruding a mixture of two thermoplastic elastomers (Kraton® G1652 and 1657) in the weight ratio of 2:1. Elastomeric fibers of 650 and 1300 denier were formed into uni-directional tapes as follows: Halar® film was placed onto a drum with 2 inch (5.08 cm) wide double-sided adhesive tape affixed at 19 inch (48.26 cm) interval, center to center, along the length direction. The thermoplastic elastomer fibers were wound to give 4.6 ends per inch (1.81 ends/cm) of width. One-sided adhesive tape was attached over the position of the double-sided tape to anchor the fiber ends in place. The anchoring tapes were slit down the middle giving webs with 17 inch (43.18 cm) length of usable unidirectional fiber mat where the filaments are held together by isolated rubber strips. The webs were slit at 17 inch (43.18 cm) intervals along the length direction to produce 17 inch (43.18 cm) squares of uni-directional rubber fiber mat having considerable spacing between monofilaments. Uni-directional Spectra® fiber tapes were prepared in the same manner, except that the 1300 denier Spectra® 1000 was wound 2.6 ends per inch (1.02 ends/cm) onto the drum. Stabilized composite panels were prepared by cross-plying a rubber mat with a Spectra® tape and molding them together at 100° C. for 5 minutes at a pressure of 10 tons per square ft ($1.076 \times 10^5$ kg/m$^2$). The stabilized panels were then cross-plied, the Halar® film was removed, and then the panels were molded together (same conditions as used to construct the stabilized uni-directional tape) with the resin rich sides of the stabilized uni-directional tape facing each other.

Uni-directional Spectra® fiber tapes were prepared in the same manner, except the 1300 denier Spectra® 1000 was wound 9.26 ends per inch (3.65 ends/cm) onto the drum.

Stabilized unidirectional tape panels were prepared by cross-plying a rubber panel with a Spectra® panel and molding them together at 100° C. for 5 minutes at 10 tons per square ft ($1.076 \times 10^5$ kg/m$^2$). These stabilized uni-tapes were cross-plied, the Halar® film was removed, and then the panels were molded together using the same conditions as those used to construct the stabilized uni-tape with the resin rich sides of the stabilized uni-directional tape against each other.

10.9: Water Vapor Transmission

The relative ability to transmit water vapor through a panel of this invention (example 10.3), compared to that of Spectra Shield® material, was determined by placing 15 grams of water in a wide mouth 2 oz. jar (inside diameter 42 mm) and recording weight loss in 24 hours at room temperature and 50% relative humidity. Panels were affixed to the jars using double stick tape around the jars. Spectra® 1000 ballistic fabric (Style 955-215 denier plain weave 55×55 ends/in. (21.7×21.7 ends/cm)) also was tested. Structures of the present invention clearly transmit water vapor at similar rates to fabric. Data are shown below in Table 2.

TABLE 2

Comparison of Water Loss

| Sample | Wt Loss | Wt. Loss %* |
|---|---|---|
| Control-open top | 8.05 g | 100 |
| Single element (ex. 10.4) | 0.01 g | 0.12 |
| Grid Reinforced (ex. 10.3) | 1.6 g | 20 |
| Spectra Fabric | 2.39 g | 30 |

*weight loss % is given by 100 × Ws/Wc, which are weight loss for sample under consideration and that of the open container, respectively.

10.10: Flexibility

Comparison of flexibility of the commercial single element, the grid reinforced panel (example 10.3) and a commercial Spectra® 1000 woven fabric was made (215 denier Spectra® 1000/45×45 ends/inch (17.32×17.72 ends/cm) planar weave, a product of Clark-Schwebel). The sample was placed on a flat surface and allowed to overhang the edge of a length (l) of 13 cm. The distance (h) below the flat surface of the free side was determined. The larger the distance (h), the more flexible the structure. As can be seen from Table 3, below, the non-woven panel with the grid was even more flexible than a woven Spectra® 1000 ballistic fabric. Samples were flexed prior to testing to simulate distressing.

TABLE 3

Comparison of Panel Flexibility

| Sample | length (l) (cm) | height (h) (cm) | h/l | % flexibility |
|---|---|---|---|---|
| Single Element | 13 | 4 | 0.3077 | 36 |
| Ballistic Fabric | 13 | 11.0 | 0.8462 | 100 |
| Grid Reinforced Panel | 13 | 11.5 | 0.8846 | 104 |

EXAMPLE 11

11.1:

A Halar® film, manufactured by Allied Signal Specialty Films, was wrapped around a drum 4 feet (121.92 cm) long and 30 inches (76.2 cm) in diameter. Strips of 2 inch (5.08 cm) wide double stick tape were applied along the length of the drum at 8 inch (20.32 cm) intervals. The drum was rotated and Spectra® 1000 fiber (1300 denier) was wrapped at 9.26 ends per inch (3.65 ends/cm). After winding the Spectra® 1000 yarn, 2 inch (5.08 ends/cm) wide strips of masking tape were applied over the areas covered by the double stick tape to firmly anchor the fibers in place. The adhesive tapes, together with Halar® film and Spectra® fiber, were cut down the center-line of the adhesive tape to produce mats with fiber lengths of 8 inches (20.32 cm) and width of 48 inches (121.92 cm). The mats were further cut to convenient sizes for use with the elastomeric fibers. A monofilament elastomeric fiber of Kraton® G1650 (2212) denier was prepared by extruding the polymer through a 0.02 inch (0.051 cm) die at 260° C. using an Instron capillary rheometer. The parallel fiber web, 8 inches (20.32 cm) square, was taped to a metal plate and double stick tape was placed on two sides of the web with tape length parallel to fiber length direction. The Kraton® G1650 fibers were placed perpendicular to the fiber direction and anchored to the tape on both sides of the web at intervals of 1 cm.

Robust uni-directional tapes were prepared by molding between metal plates with Halar® film on one side and then removing it after molding at 125° C. at low pressure in an hydraulic press. The tapes were cross-plied and molded again to create 0/90 panels having total areal density of 0.154 kg/m² and 32 wt. % matrix. The width of the deformed Kraton® G1650 fiber was approximately 3 mm, corresponding to 49% areal coverage. After some initial flexing, a soft low friction panel was created. During molding process distortion of the Spectra® fibers occurred, voids were removed, and the initial stiffness was high, compared to the flexed material.

11.2:

This sample was identical to Example 11.1, except that the Kraton® fiber was chopped into 3 cm lengths that were placed randomly on the fiber web. This was then molded to produce a uni-directional tape. Flow of the Kraton® G1650 caused significant distortion in the fiber web, an undesirable feature.

11.3:

This sample was similar to Example 11.1, except that the elastomeric fiber was Kraton® G1651 of 275 denier, that was extruded through a 0.007 inch die at 260° C. Both the uni-directional tape, and the resultant 0/90 cross-plied panel had 5.5 wt % matrix. The areal density of the 0/90 panel was 0.1113 kg/m². The elastomeric fiber broadened to less than 1 mm, resulting in 20% of panel area having elastomeric coverage.

11.4:

This sample was similar to Example 11.1, except that the elastomeric fibers (Kraton® G1651 of 811 denier) were oriented at 45 degrees to the length direction of the Spectra® fibers. The elastomeric fiber was extruded through a 0.012 inch (0.0305 cm) die at 260° C. Both the unidirectional tape and the resultant 0/90 cross-plied panel had 20 wt % matrix. Two different structures were possible, with the elastomeric fibers forming a diamond shape or a series of parallel lines at 45 degrees to the Spectra® fiber lengths. When the resin rich sides were pressed together, the final molded panel was coherent and had very low friction.

EXAMPLE 12

Tapes were prepared in the following manner: PE film, 0.00035 inch (0.000889 cm) thick, manufactured by Raven Industries of Sioux City, S. Dak. was placed on a drum; the drum was rotated and latex sprayed onto the film surface forming a statically uniform dispersion of droplets; Spectra® fiber 1000/650 denier, 240 filaments per end, was then wound onto the drum; and the Spectra® fiber web was sprayed with the latex.

These tapes were robust enough to be handled to prepare a final cross-plied panel suitable for bulletproof vest applications. Uni-directional tapes were cross-plied (0/90) and molded under different conditions. The cross-plied panels generally showed a combination of good flexibility with good ballistic performance. The cross-plied panels showed that control of the matrix amount, consolidation and distribution may be tailored with properties to address a particular use.

12.1:

A parallel fiber web was evenly coated with a Kraton® D1107 solution in cyclohexane, and then passed through a drying chamber to remove solvent to produce a uni-directional tape material. This material was cross-plied and polyethylene film, 0.00035 inch (0.000889 cm) thick, manufactured by Raven Industries of Sioux City, S. Dak. was laminated onto the top and bottom surface to prevent panels from sticking together. Molding conditions were 120° C. for 10 minutes. Areal density of the panel, fiber, matrix, and PE film were 0.147, 0.105, 0.0262, and 0.0157 kg/m², respectively. The PE film had a melting point of 114° C. The polyethylene film added weight and stiffness over matrix Kraton® D1107, alone.

12.2:

Matrix Present as Discrete Thermoplastic Domains

A Halar® film (a product of AlliedSignal Specialty Films, Pottsville, Pa.) was wrapped around a drum (4 ft. (121.92 cm) long by 30 in. (76.2 cm) diameter). The drum was rotated and Spectra® 1000 fiber (1300 denier), was wrapped at 9.26 ends per inch (3.65 ends/cm). The fiber web was sprayed with a latex (Kraton® D1107 and Prinlin B7137X-1, a product of Pierce and Stevens in weight ratio 3:1). This uni-directional tape, together with the Halar® backing was cut up into 15 inch (38.1 cm) squares and cross-plied 0/90 with tape on the inside. The cross-plied material was then molded at 125° C. for 15 minutes at 10 tons/square foot ($1.076 \times 10^5$ kg/m²). The Halar® film was removed and a polyethylene film (identical to film used in Example 12.1) was placed on the outside surfaces of the 0/90 panel and the entire assembly molded in an identical manner to the first molding, except that molding time was 2 minutes. Eight 15 inch (38.1 cm) square panels were stacked together, clamped and tested against a clay backing using 0.38 caliber lead bullets (158 grains). $V_{50}$ value was 824 ft/s (251.2 m/s).

12.3:

Kraton® D1107 and Prinlin Matrix Domains with PE Film (Matrix Domains were Sprayed) 8 Panels, Wt. % Fiber at 81% and ADT=1.04 kg/m²

This sample was constructed to be similar to Example 12.2, except that a polyethylene film (identical to the film on the surface of the panels of Example 12.2) was wrapped onto a metal drum (4 ft. in length and 30 inches in diameter) and a latex was sprayed onto its surface (areal density of Kraton®/Prinlin matrix sprayed on surface was 0.0019 kg/m$^2$). Circular domains of elastomer within the plane of the tape in the size range of 125 to 250 microns and covering approximately 25% of the film surface were created. Spray process was carried out with a Wagner Power Painter-Model 310 using 0.8 mm nozzle. Spraying began at one end of the rotating drum and proceeded to the other end, producing individual circular matrix domains. Spectra® 1000 fiber was wound in an identical manner as described in Example 12.2 and the fiber mat was also sprayed in a similar manner to Example 12.2. This produced a robust uni-directional tape with the elimination of a release backing. A series of 0/90 panels were molded with the polyethylene film on the surface. Molding was carried out at 80° C., 95° C., 105° C. and 130° C. for 15 minutes at 10 tons/square ft (1.076×10$^5$ kg/m$^2$). As molding temperature increased the panels became more paper-like and less fabric-like in flexibility. The panel molded at 95° C. was flexed a few times and was measured for flexibility in a manner as described in Example 10.10. The panel had a flexibility of 0.96 and percent flexibility of 114% compared to the ballistic fabric (see Example 10:10).

One 0/90 panel was molded against an array of washers (0.075 inch thick, outer diameter 0.87 inch, and inner diameter 0.37 inch). Fully consolidated washer shapes were imprinted into the panel. This demonstrated that patterns of consolidation can be generated from panels of this invention. Useful domain structures, which provide continuous lines which can easily fold (such as equilateral triangular arrays), can easily be constructed.

Eight of the panels molded at 95° C. were tested against 0.38 cal lead bullets. In addition, one panel was placed in a spot bonding mold having square grid with raised circular domains at grid intersections (circular sections were 1.0 mm in diameter and center-to-center distance was 7 mm). The panel was placed in a press at approximately 500 psi and molded for 150 seconds at 115° C. The circular domains were consolidated (approximately 1.6 area percent) and the remaining areas remained unconsolidated. The panel remained flexible.

12.4:

This sample was prepared as described in Example 12.3.

TABLE 4

Comparative Ballistic Performance of Flexible Armor against .38 Caliber Lead Bullets

| Sample | ADT (kg/m$^2$) | Fiber wt % | V$_{50}$ (ft/s) [m/s] | SEAT (Jm$^2$/kg) | Domains |
|---|---|---|---|---|---|
| 12.1 | 1.05 | 72 | 720[219.5] | 234 | No |
| 12.2 | 1.04 | 81 | 824[251.2] | 310 | Yes |
| 12.3 | 1.24 | 81 | 789[240.5] | 296 | Yes |
| 12.4 | 1.04 | 78 | 858[261.5] | 327 | Yes |

EXAMPLE 13

The following structures were investigated:

A. Single Element Spectra Shield® Material

This structure, incorporating 0/90 prepreg, requires PE film on top and bottom to prevent fusing of panels due to the tackiness of the matrix (Kraton® D1107). The panels are coherent and have a relatively low wt. % fiber (72%). The sandwich construction impedes flexibility, as shown in Table 5.

B. Minor Modification of Single Element for Improved Performance

The basic idea is to substitute matrix domains for the continuous matrix arrangement in the commercial product of A in order to achieve more flexibility. This was done by spraying a latex of Kraton® D1107 through a paint sprayer onto a fiber web on a rotating drum, giving a statistically uniform distribution. The process was quite straightforward, yielding domains on the surface of the fiber mat. Resin rich surfaces were mated and PE film was placed on the top and bottom. The assembly was molded to produce flexible panels which were stacked to make ballistic targets, giving a 81 weight percent of fiber. With reference to Table 5, note that the ballistic (SEAT) efficiency is approximately 1.3 times that of the commercial control (A), and that weight % fiber is substantially higher than for the commercial product.

C. Matrix—PE Powder Designed for Rotational Molding

Best ballistic results were obtained with this system. A linear low density polyethylene powder (T$_m$=105° C.) was pumped as a slurry onto a fiber mat on a rotating drum. The 0/90 panel made therefrom was flexible and had low surface friction. Advantages of the PE powders were their lower cost and solvent-free manufacturing processes. With reference to Table 5, ballistic performance (SEAT) was outstanding in comparison with the control Sample A.

D(1)–D(2). Matrix EPDM/PE Powder in Wt. Ratio 1:4

Some difficulties were encountered in making parallel fiber webs with PE powder because the powder did not adhere to the fiber on the drum and tended to fall off. It was discovered that a slurry of PE powder in an EPDM solution adhered well to the fiber mat on the rotating drum. However, ballistic performance was not as good as obtained when the PE powder was used alone.

Table 5 summarizes ballistic efficacy of these experimental materials, based on SEAT values.

TABLE 5

Comparative Ballistic Performance of Flexible Armor against .38 Caliber Lead Bullets

| Sample | ADT | Fiber wt % | V$_{50}$ (ft/s) [m/s] | SEAT (Jm$^2$/kg) | Domains |
|---|---|---|---|---|---|
| A (control) | 1.05 | 72 | 720[219.5] | 234 | No |
| B | 1.04 | 81 | 824[251.2] | 310 | Yes |
| C | 0.981 | 88 | 854[260.3] | 353 | Yes |
| D (1) | 1.00 | 85 | 774[235.9] | 283 | Yes |
| D (2) | 1.04 | 80 | 750[228.6] | 257 | Yes |

EXAMPLE 14

An aramid fiber reinforced flexible target was prepared as described in Example 12.3. Twaron fiber (a product of Akzo, 1450 denier yarn, 1.5 denier per filament, tensile strength 24.4 g/denier, modulus 805 g/denier) was substituted for the Spectra® 1000 yarn and wound on the drum at 8.3 turns per inch. The target, having seven 0/90 panels with ADT=0.995 kg/m$^2$, was ballistically tested against a 0.38 lead bullet. V$_{50}$ was 924 ft/s (281.6 m/s) and SEAT was 408 J-Kg/m$^2$. The structure provided good ballistic protection.

EXAMPLE 15

15.1:

A Halar® film (a product of AlliedSignal Specialty Films, Pottsville, Pa.) is wrapped around a drum, 4 ft. (121.92 cm) long by 30 in. (76.2 cm) diameter. The drum is rotated and PBZO fiber (1300 denier), was wrapped at 9.26 ends per inch (3.65 ends/cm). The fiber web is sprayed with a latex (Kraton® D1107 and Prinlin B7137X-1, a product of Pierce and Stevens in weight ratio 3:1). This unidirectional tape, together with the Halar® backing is cut up into 15 inch (38.1 cm) squares and cross-plied 0/90 with tape on the inside. The cross-plied material is then molded at 125° C. for 15 minutes at 10 tons/square foot ($1.076 \times 10^5$ kg/m$^2$). The Halar® film is removed and a polyethylene film is placed on the outside surfaces of the 0/90 panel and the entire assembly is molded. Eight 15 inch (38.1 cm) square panels are stacked together, clamped and tested against a clay backing using 0.38 caliber lead bullets (158 grains). $V_{50}$ value is expected to be higher than a similar amount of PBZO fiber in a conventional Shield-style product.

EXAMPLE 16

16.1:

A Halar® film (a product of AlliedSignal Specialty Films, Pottsville, Pa.) is wrapped around a drum, 4 ft. (121.92 cm) long by 30 in. (76.2 cm) diameter. The drum is rotated and PBZT fiber (1300 denier), was wrapped at 9.26 ends per inch (3.65 ends/cm). The fiber web is sprayed with a latex (Kraton® D1107 and Prinlin B7137X-1, a product of Pierce and Stevens in weight ratio 3:1). This uni-directional tape, together with the Halar® backing is cut up into 15 inch (38.1 cm) squares and cross-plied 0/90 with tape on the inside. The cross-plied material is then molded at 125° C. for 15 minutes at 10 tons/square foot ($1.076 \times 10^5$ kg/m$^2$). The Halar® film is removed and a polyethylene film is placed on the outside surfaces of the 0/90 panel and the entire assembly is molded. Eight 15 inch (38.1 cm) square panels are stacked together, clamped and tested against a clay backing using 0.38 caliber lead bullets (158 grains). $V_{50}$ value is expected to be higher than a similar amount of PBZT fiber in a conventional Shield-style product.

The foregoing summary, description, examples and drawings of the invention are not intended to be limiting, but are only exemplary of the inventive features that are defined in the claims.

What is claimed is:

1. A flexible composite comprising:
   a plurality of filaments; and
   a plurality of matrix islands, each at said matrix islands having an average size of less than 5 mm in a planar dimension and connecting at least two filaments so as to hold the plurality of filaments in a unitary structure;
   wherein the final volume ratio of matrix islands to the plurality of filaments in the composite is approximately 0.5 or less, and wherein said composite has an SEAT value equal to or greater than 257 J-m$^2$/Kg on impact by 0.38 caliber, 158 grain lead bullets.

2. The composite of claim 1, wherein the plurality of filaments are arranged in a planar, essentially parallel array.

3. The composite of claim 1, wherein the plurality of filaments comprises individual filaments having an average modulus of from about 300 g/denier or greater and an average tenacity of from about 7g/denier or greater.

4. The composite of claim 1, wherein the final volume ratio of matrix islands to the plurality of filaments is approximately 0.4 or less.

5. The composite of claim 1, wherein the final volume ratio of matrix islands to the plurality of filaments in the composite is approximately 0.25 to about 0.02.

6. The composite of claim 1, wherein the final volume ratio of matrix islands to the plurality of filaments in the composite is approximately 0.2 to about 0.05.

7. The composite of claim 1, wherein the filaments are filaments selected from the group consisting of ultrahigh molecular weight polyethylene of molecular weight greater than about 500,000, polypropylene of weight average molecular weight greater than about 750,000, aramid, polyvinyl alcohol of weight average molecular weight greater than about 400,000, polybenzoxazole, polybenzothiazole, fiberglass, ceramic and combinations thereof.

8. The composite of claim 7 wherein the plurality of filaments comprises ultrahigh molecular weight polyethylene of molecular weight greeter than about 500,000.

9. The composite of claim 8 wherein the polyethylene filaments have a tenacity of from about 30 g/denier or greater and a modulus of from about 1500 g/denier or greater.

10. The composite of claim 7, wherein the plurality of filaments comprise aramid.

11. The composite of claim 1, wherein the matrix islands comprise a flexible composition selected from the group consisting of elastomers, thermoplastic elastomers, thermoplastics, thermosets and combinations thereof.

12. The composite of claim 11, wherein the matrix islands comprise an elastomer.

13. The composite of claim 11, wherein the elastic matrix islands comprise a combination of two or more elastomers, thermoplastic elastomers and thermoplastics.

14. The composite of claim 1, wherein the domain matrix provides a robust structure of filaments.

15. The composite of claim 1, wherein each filament within the composite contacts at least one matrix island.

16. The composite of claim 15, comprising a plurality of matrix islands in a predetermined pattern.

17. A uni-directional tape comprising the composite of claim 1.

18. The composite of claim 1, wherein the average size of the matrix islands is less than 3 mm in a planar dimension.

19. The composite of claim 1, wherein the average size of the matrix islands is less than 1 mm in a planar dimension.

20. The composite of claim 1, wherein the composite possess an h/l ratio of from about 0.7 or more.

21. The composite of claim 1, wherein the composite possess an h/l ratio of from about 0.85 or more.

22. A flexible composite comprising:
   multiple layers of fibrous webs; wherein each fibrous web is comprised of a plurality of filaments; and a plurality of matrix islands, each of said matrix islands having an average size of less than 5 mm in a planar dimension and connecting at least two filaments so as to hold the plurality of filaments in a unitary structure, and
   wherein the final volume ratio of matrix islands to the plurality of filaments in the composite is approximately 0.5 or less and wherein said composite has a V50 value against 0.38 caliber, 158 grain lead bullets greater than a composite of the same areal density having a continuous polymeric matrix.

* * * * *